(12) United States Patent
Winter

(10) Patent No.: US 8,273,472 B2
(45) Date of Patent: Sep. 25, 2012

(54) SHUNT CURRENT INTERRUPTION IN ELECTROCHEMICAL ENERGY GENERATION SYSTEM

(75) Inventor: Rick Winter, Orinda, CA (US)

(73) Assignee: Primus Power Corporation, Hayward, CA (US)

( * ) Notice: Subject to any disclaimer, the term of this patent is extended or adjusted under 35 U.S.C. 154(b) by 394 days.

(21) Appl. No.: 12/656,664

(22) Filed: Feb. 12, 2010

(65) Prior Publication Data

US 2011/0200853 A1    Aug. 18, 2011

(51) Int. Cl.
*H01M 2/38* (2006.01)

(52) U.S. Cl. .......................... 429/51; 429/101; 429/105

(58) Field of Classification Search ....................... 429/51
See application file for complete search history.

(56) References Cited

U.S. PATENT DOCUMENTS

| | | |
|---|---|---|
| 3,540,934 A | 7/1967 | Boeke |
| 3,644,190 A | 2/1972 | Weist et al. |
| 3,713,888 A | 1/1973 | Symons |
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A | 1/1978 | Carr |
| 4,071,660 A | 1/1978 | Hart |
| 4,072,540 A | 2/1978 | Symons et al. |
| 4,086,393 A | 4/1978 | Hart |
| 4,100,332 A | 7/1978 | Carr |
| 4,115,529 A | 9/1978 | Behling |
| 4,127,701 A | 11/1978 | Symons et al. |
| 4,146,680 A | 3/1979 | Carr et al. |
| 4,162,351 A | 7/1979 | Putt et al. |
| 4,200,684 A | 4/1980 | Bro |
| 4,257,867 A | 3/1981 | Hammond et al. |
| 4,273,839 A | 6/1981 | Carr et al. |
| 4,287,267 A | 9/1981 | Whittlesey et al. |

(Continued)

FOREIGN PATENT DOCUMENTS

JP    63-314782 A    12/1988

(Continued)

OTHER PUBLICATIONS

Symons, Philip C., "Advanced Technology Zinc/Chlorine Batteries for Electric Utility Load Leveling," 19th Intersociety Energy Conversion Engineering Conf., 1984, vol. 2, 857-862.

(Continued)

*Primary Examiner* — John S Maples
(74) *Attorney, Agent, or Firm* — The Marbury Law Group PLLC

(57) ABSTRACT

An electrochemical energy generation system includes plural electrochemical cells connected electrically in series that utilize a common electrolyte that can be delivered to each of the cells and/or collected from each of the cells using one or more manifolds. The system provides a possibility for reducing shunt currents by applying a shunt-current minimizing voltage to terminals of the manifolds from the terminal electrodes of the cells connected in series.

16 Claims, 6 Drawing Sheets

U.S. PATENT DOCUMENTS

| | | | |
|---|---|---|---|
| 4,306,003 A | 12/1981 | Henriksen | |
| 4,307,159 A | 12/1981 | Hammond et al. | |
| 4,320,179 A | 3/1982 | Hart | |
| 4,371,825 A | 2/1983 | Chi et al. | |
| 4,413,042 A | 11/1983 | Carr | |
| 4,414,292 A | 11/1983 | Kiwalle et al. | |
| 4,415,847 A | 11/1983 | Galloway | |
| 4,518,663 A | 5/1985 | Kodali et al. | |
| 4,518,664 A | 5/1985 | Whittlesey et al. | |
| 4,534,833 A | 8/1985 | Carr et al. | |
| 4,567,120 A | 1/1986 | Jorne et al. | |
| 4,678,656 A | 7/1987 | Bjorkman, Jr. et al. | |
| 4,728,587 A | 3/1988 | Horie et al. | |
| 4,746,585 A | 5/1988 | Stoner et al. | |
| 4,784,924 A | 11/1988 | Savinell et al. | |
| 7,320,844 B2 * | 1/2008 | Skyllas-Kazacos | 429/105 |
| 7,704,634 B2 * | 4/2010 | Deguchi et al. | 429/105 |
| 8,039,161 B2 * | 10/2011 | Winter | 429/447 |
| 8,114,541 B2 * | 2/2012 | Winter | 429/199 |
| 8,137,831 B1 | 3/2012 | la O' et al. | |
| 2004/0234843 A1 | 11/2004 | Skyllas-Kazacos | |
| 2005/0181273 A1 | 8/2005 | Deguchi et al. | |
| 2005/0244707 A1 | 11/2005 | Skyllas-Kazacos et al. | |
| 2009/0239131 A1 | 9/2009 | Winter | |
| 2010/0009243 A1 | 1/2010 | Winter | |
| 2010/0021805 A1 | 1/2010 | Winter | |
| 2010/0119937 A1 | 5/2010 | Winter | |
| 2011/0200853 A1 | 8/2011 | Winter | |

FOREIGN PATENT DOCUMENTS

| | | |
|---|---|---|
| JP | 02-010671 A | 1/1990 |
| WO | WO 2008/089205 A2 | 7/2008 |

OTHER PUBLICATIONS

International Search Report mailed Jul. 8, 2008, in PCT/US2008/051111 (WO 2008/089205), 2 pages.

EPRI Report, EM-1051 (parts 1-3), Apr. 1979, Electric Power Research Institute.

U.S. Appl. No. 13/357,270, filed Jan. 24, 2012, Rick Winter, Specification & Drawings.

International Preliminary Report on Patentability, PCT/US2010/042774, Feb. 2, 2012, 6pgs.

* cited by examiner

100

SHUNT CURRENT INTERRUPTION IN ELECTROCHEMICAL ENERGY GENERATION SYSTEM

FIELD

The present inventions generally relate to electrochemical energy generation systems and methods and more particularly to metal halide electrochemical energy systems and methods of making and using such systems.

SUMMARY

One embodiment of the invention provides an electrochemical energy generation system comprising:
(a) a plurality of cells connected in series, wherein each of the cells comprises:
a first electrode;
a second electrode; and
a reaction zone between the first and second electrodes; and
at least one of a first manifold and a second manifold; and
wherein terminal electrodes of the plurality of cells connected in series are electrically connected to terminals of at least one of the first manifold and the second manifold to apply a shunt-current minimizing voltage to the terminals.

DETAILED DESCRIPTION

Related Applications

Figure 1:
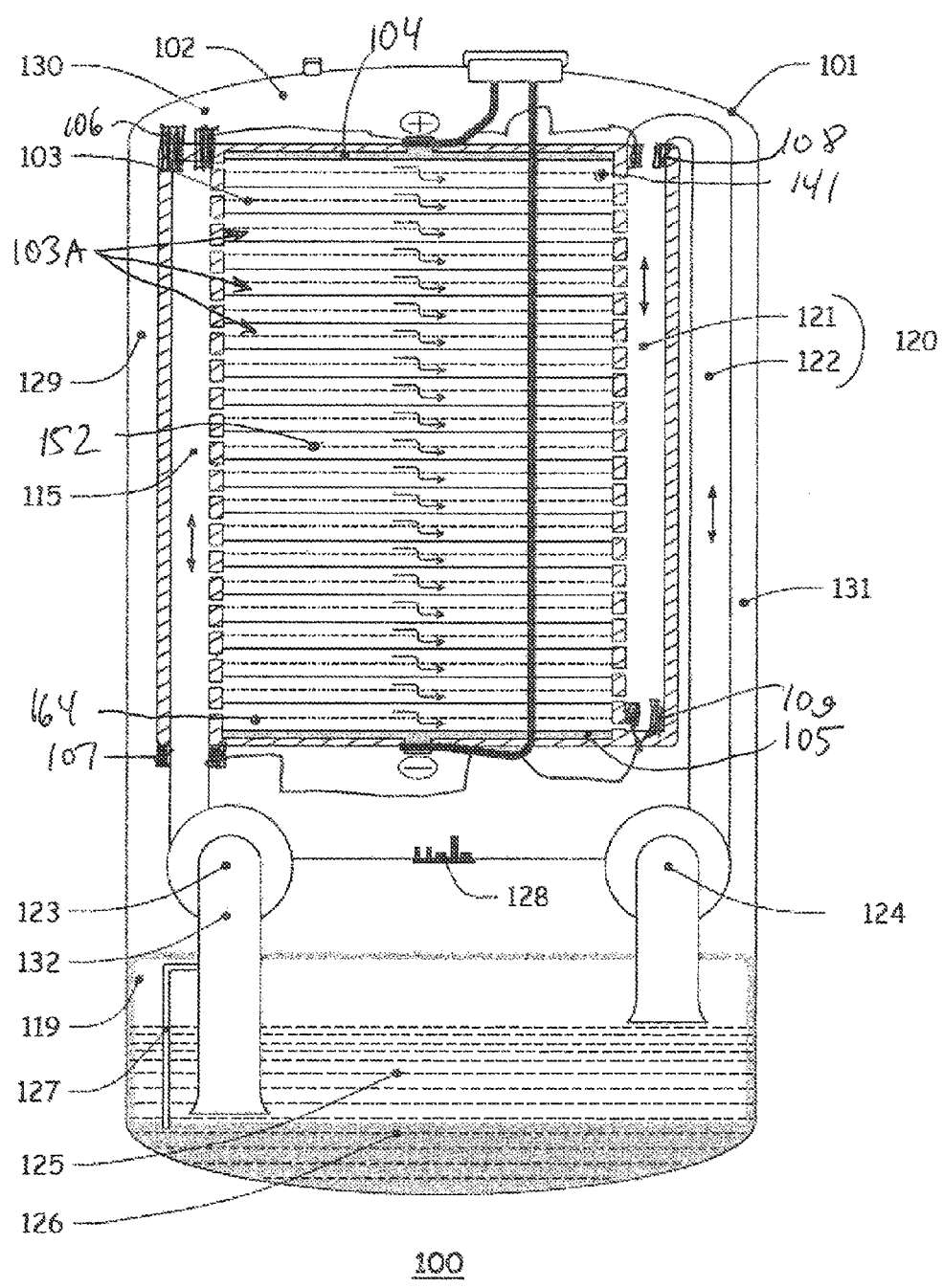
FIG. 1 illustrates a side cross section view of an embodiment of the electrochemical energy generation system with a sealed container containing a stack of electrochemical cells.

The present application incorporates herein by reference in their entirety the following patent documents, which may be helpful for understanding the present disclosure: a) PCT publication no. WO2008/089205 and b) U.S. patent application Ser. No. 12/458,853.

Disclosure

The embodiments of the present invention relate to an electrochemical system (also sometimes referred to as a "flow battery") that a) includes plural electrochemical cells connected electrically in series and b) utilizes a common electrolyte that can be delivered to each of the cells of the series and/or collected from each of the cells of the series using one or more manifolds. In such electrochemical systems, shunt currents can cause an undesirable imbalance between individual cells in the series (referred to as a stack). In a charge mode, such imbalance may mean that an amount of a depositable metal deposited from the electrolyte on a metal electrode of a first cell, which is closer to the center of the stack, may be different, e.g. less, than an amount of the depositable metal deposited from the electrolyte on a metal electrode of a second cell, which is further from the center of the stack than the first cell. The second cell may be located at the top or bottom near the end of the stack. In a discharge mode, such imbalance may mean that cell(s), which are closer to the center of the stack may be discharged more than cell(s) which are further from the center of the stack. To reduce and/or prevent shunt currents in the system, the present inventor proposes applying to one or more manifolds, such as a manifold that is configured to deliver the common electrolyte to the cells and/or a manifold that is configured to collect the common electrolyte from the cells, a shunt current minimizing voltage that can create in the manifold a potential distribution that can mimic or substantially mimic a potential distribution in the electrochemical cells connected in series.

The shunt current minimizing voltage may be applied to two terminals of the manifold, one of which may be at a level of a first terminal cell of the stack, while the other of the terminals may be at a level of a second terminal cell of the stack. In many embodiments, the shunt current minimizing voltage may be equal or substantially equal (e.g. the absolute difference is less than 10%) to a voltage between terminal electrodes of the stack. For example, in a discharge mode, the shunt current minimizing voltage may be equal or substantially equal to an output voltage between the terminal electrodes of the stack, while in a charge mode, the shunt current minimizing voltage may be equal or substantially equal to a charge voltage applied to the terminal electrodes of the stack.

The electrochemical system may comprise at least two, preferably at least three electrochemical cells connected electrically in series. For example, the system may comprise at least 5 cells connected in series, such as 12 to 24 cells connected in series, e.g. at least 24 cells connected in series. In some embodiments, the stack may contain from 5 to 80 cells or from 10 to 60 cells or from 24 to 48 cells.

Each of the electrochemical cells of the system may comprise a first electrode, a second electrode and a reaction zone between the electrodes. For the clarity purposes only, throughout this disclosure, the first electrode will refer to an electrode that may serve as a positive electrode in the discharge mode, while the second electrode will refer to an electrode that may serve as a negative electrode in the discharge mode.

The system may include first and second terminal electrodes for the stack plural cells connected electrically in series. In some embodiments, at least one of the terminal electrodes may itself be an electrode of a terminal cell of the stack. Yet in some embodiments, at least one of the terminal electrodes may be electrically connected to an electrode of a terminal cell of the stack.

The system may contain at least one metal, which may be in at least one of the following two forms: 1) a reduced elemental form as a part of the second electrode of the cell; and 2) an oxidized, ionic form as a part of the electrolyte. In many embodiments, the system may contain at least one depositable metal, i.e., a metal, which may be deposited from an electrolyte solution in its reduced elemental form as an electrode or a part of an electrode. The use of depositable metals, such as Zn, may allow the electrochemical system to function as a reversible or a rechargeable system. In the discharge mode, such a reversible system may consume the depositable metal from the second electrode of the cell by oxidizing the metal to its captions that end up in the electrolyte; while in the charge mode, the system may replenish the metal on the second electrode by reducing the cations from the electrolyte back into the elemental metal, which may be deposited back on the electrode.

In many embodiments, the electrochemical system may also include a halogen, which may be in at least one of the following two forms: 1) an oxidized, elemental (molecular) form, which will be referred throughout this disclosure as a halogen reactant; 2) a reduced, ionic form as a part of the electrolyte.

In many embodiments, the halogen in the reduced, ionic form and the metal in the oxidized, ionic form may be parts of a metal halide electrolyte of the system.

In the discharge mode, the halogen reactant may be reduced at the first electrode to form halogen ions, which may become a part of the system's electrolyte; while in the charge mode, halogen ions may be oxidized at the first electrode into the elemental (molecular halogen). In many embodiments, the halogen may be chlorine.

In some embodiments, the halogen reactant may be a liquid halogen reactant, i.e., a halogen reactant in a liquid form. The term "liquid halogen reactant" may refer to at least one of molecular halogen dissolved in water, which is also known as "wet" halogen or aqueous halogen, and "dry" liquid molecular halogen, which is not dissolved in water.

In some embodiments, the halogen reactant may be a liquid molecular chlorine, i.e. molecular chlorine in a liquid form. The term "liquid molecular chlorine" may refer to at least one of molecular chlorine dissolved in water, which is also known as "wet" chlorine or aqueous chlorine, and "dry" liquid molecular chlorine, which is not dissolved in water. The liquid molecular chlorine has a gravity which is approximately two times greater than that of water.

Figure 4:
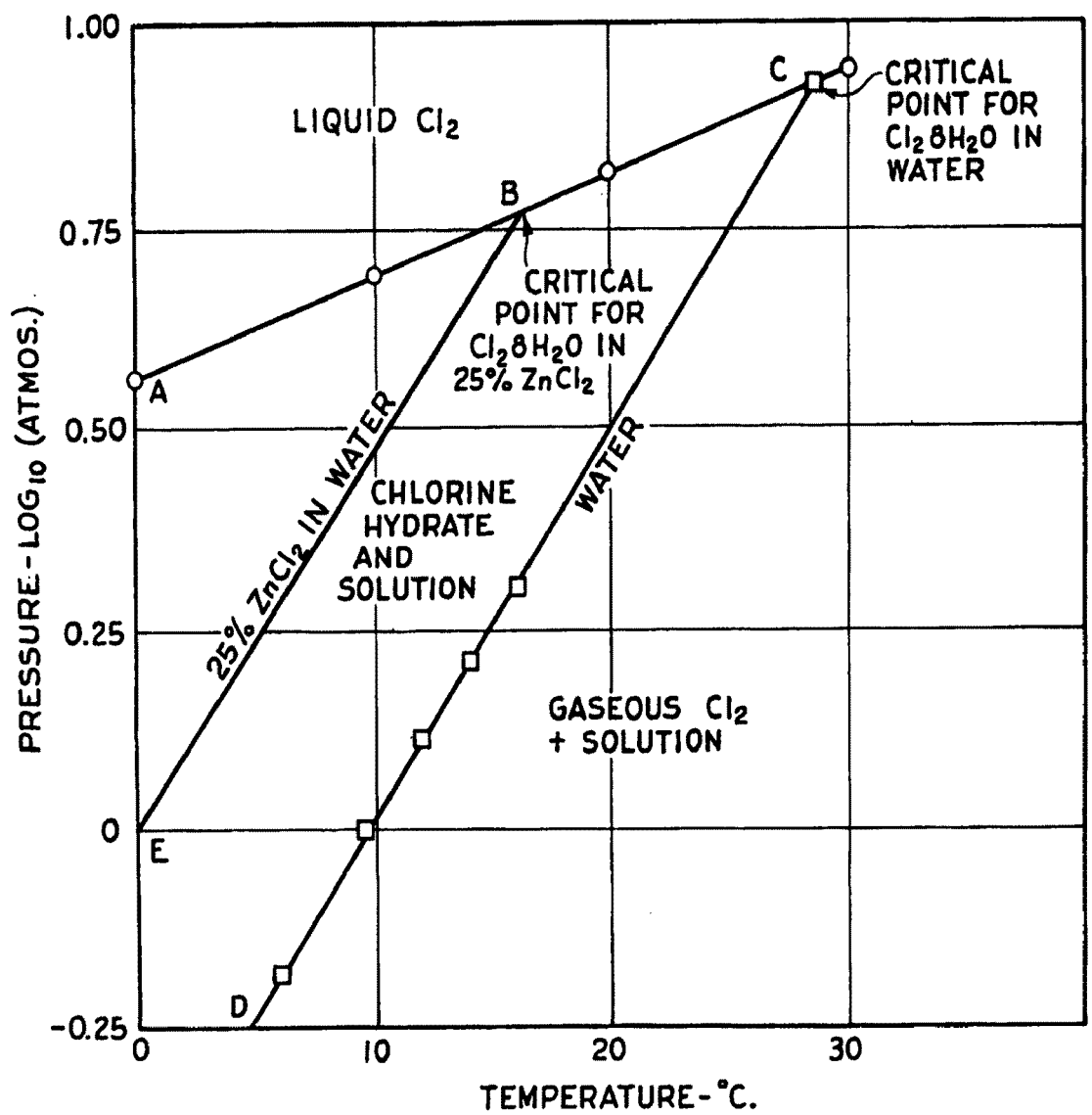
FIG. 4 is a prior art phase diagram for a molecular chlorine as presented in U.S. Pat. No. 3,940,283.

In some embodiments, the system may be operated at a pressure, which is no less than a liquefication for the halogen reactant. A liquefication pressure for a particular halogen reactant for a given temperature may be determined from a phase diagram for the halogen reactant. For example, FIG. 4 presents a phase diagram for chlorine, from which a liquefication pressure for a given temperature may be determined.

In many embodiments, the system may include a first manifold and a second manifold. One of the first and second manifold may be configured to deliver at least one of the electrolyte and the halogen reactant to each of the plural cells, i.e., be a feed manifold; while the other of the first and second manifold may be configured to collect at least one of the electrolyte and the halogen reactant from each of the plural cells, i.e., be a return manifold. In many embodiments, the electrolyte and the halogen reactant may share the same flow path in at least one of the first and second manifolds.

The first and second manifolds may switch their roles in the charge mode compared to their roles in the discharge mode. For example, if in the discharge mode, the first manifold acts as a feed manifold and the second manifold acts as a return manifold, then in the charge mode, the first manifold may become a return manifold and the second manifold may become a feed manifold.

Each of the first and second manifolds may comprise two electrodes, to which the shunt current minimizing voltage may be applied. Preferably, one of these electrodes is located in a proximity of a point of fluidic contact, such as a manifold inlet or outlet; while the other electrode is located in a proximity of an opposite point of fluidic contact, such as an outlet or inlet of the manifold. Each of the manifold's electrodes may comprise one or more of a number of conducting materials, such as metals and/or conducting metallic oxides. In certain embodiments, the electrodes may comprise titanium and optionally ruthenium oxide, which may be located over the titanium as a layer. In some embodiments, at least one of the electrodes may comprise a ruthenized titanium plate, which may include a metallic titanium layer between two ruthenium oxide layers.

In some embodiments, the electrochemical energy generation system may include a sealed vessel, such as a pressure vessel, that may contain in its inner volume one or more of the following elements: the stack of plural electrochemical cells connected in series, the electrolyte, the halogen reactant, such as a molecular chlorine reactant, and the first and the second manifolds.

In some embodiments, when the system that utilizes the liquid halogen reactant, such as liquid molecular chlorine, in the sealed container, it does not require a compressor, which can be used in other electrochemical systems for compression of gaseous halogen reactants. Such a system does not require either a separate storage for the halogen reactant, which is located outside the inner volume of the sealed vessel.

The first and second manifolds may be a part of a flow circuit, which in some embodiments may be contained in the inner volume of the sealed container. In some embodiments, the flow circuit may be a closed loop circuit. In some embodiments, the loop circuit may be a sealed loop circuit. Although the components, such as the halogen reactant and the electrolyte, circulating through the closed loop may be in a liquid state, the closed loop may contain inside a certain amount gas, such as chlorine gas.

In certain embodiments, the loop circuit may be such that the electrolyte and the halogen reactant circulate through the same flow path without a separation in the cell(s).

In many embodiments, the reaction zone of each of the cells may be such that no separation of the halogen, such as the molecular halogen reactant or ionized halogen dissolved in water of the electrolyte solution, occurs in the reaction zone. For example, when the halogen reactant is a liquid chlorine reactant, the reaction zone can be such that no separation of chlorine, such as the molecular chlorine reactant or chlorine ions dissolved in water of the electrolyte solution, occurs in the reaction zone. The reaction zone may be such that it does not contain a membrane or a separator between the electrodes of the same cell that is impermeable to the halogen reactant or ionized halogen dissolved in water of the electrolyte solution. For example, the reaction zone may be such that it does not contain a membrane or a separator between the electrodes of the same cell that is impermeable to the liquid chlorine reactant or chlorine ions dissolved in water of the electrolyte solution.

In certain embodiments, the first electrode of the electrochemical cell may be a porous electrode or contain at least one porous element. For example, the first electrode may comprise a porous carbonaceous material, such as a porous carbon foam. In the discharge mode, the first electrode may serve as a positive electrode, at which the halogen may be reduced into halogen ions. The use of the porous material in the first electrode may increase efficiency of the halogen reactant's reduction.

In many embodiments, the second electrode may comprise a depositable metal, such as Zn, in the elemental form. In some embodiments, the depositable metal in the electrode may self supported. Yet in some other embodiments, the depositable metal may be deposited on a substrate. In some embodiments, such substrate may comprise a polymer material such as PVC. Yet in some embodiments, the substrate may comprise a metal, which may be inert to the halogen reactant, such as molecular chlorine. For example, the substrate may comprise titanium or titanium covered with a layer of a rare earth oxide material, such as RuO. Preferably, the electrolyte of the system is an aqueous electrolytic solution. The electrolyte solution may contain ions of the depositable metal, such as Zn ions, and halogen ions, such chlorine ions. In many embodiments, the electrolyte solution may be an aqueous solution of ZnCl, with a concentration of ZnCl ranging 5 to 50%, such as 25%. In certain embodiments, the electrolyte may contain one or more additives, which can enhance the electrical conductivity of the electrolytic solution. For example, when the electrolyte contains ZnCl, such additive can be one or more salts of sodium or potassium, such as NaCl or KCl.

FIG. 1 illustrates an electrochemical energy generation system 100 which includes a stack 103A of plural electrochemical cells 103 connected in series, an electrolyte, a halogen reactant, a first manifold 115 and a second manifold 120.

In some embodiments, the system may include a sealed container 101, which may be a pressure containment vessel, which is configured to maintain a pressure above one atmosphere in its inner volume 102. The sealed container 101 may be configured to maintain a pressure in its inner volume above the liquefication pressure for the halogen reactant, such as elemental chlorine. For functioning at a normal temperature such as 10-40 C, the sealed container may be configured to maintain an inside pressure of at least 75 psi or of at least 100 psi or of at least 125 psi or of at least 150 psi or of at least 175 psi or of at least 200 psi or of at least 250 psi or of at least 300 psi or of at least 350 psi or of at least 400 psi or of at least 450 psi or of at least 500 psi or of at least 550 psi or of at least 600 psi, such as 75-650 psi or 75-400 psi and all subranges described previously. The walls of the sealed container may be composed of a structural material capable to withstand the required pressure. One non-limiting example of such material is stainless steel.

In some embodiments, the plural electrochemical cells 103 may form a vertical stack of horizontally positioned cells that are connected in series. Each of the horizontally positioned cells may include a horizontal positive electrode and horizontal negative electrode separated by a gap. The horizontally positioned cell(s) may be advantageous because when the circulation of the metal halide electrolyte and the halogen reagent stops due to, for example, turning off a discharge or a charge pump, some amount of liquid (the electrolyte and/or the halogen reactant) may remain in the reaction zone of the cell. The amount of the liquid may be such that it provides an electrical contact between the positive and negative electrodes of the same cell. The presence of the liquid in the reaction zone may allow a faster restart of the electrochemical system when the circulation of the electrolyte and the halogen reagent is restored compared to systems that utilize a vertically positioned cell(s), while providing for shunt interruption. The presence of the electrolyte in the reaction zone may allow for the cell to hold a charge in the absence of the circulation and thus, ensure that the system provides uninterrupted power supply (UPS). The horizontally positioned cell in a combination with a liquid chlorine reactant used as a halogen reactant may also prevent or reduce a formation of chlorine bubbles during the operation.

Figure 2:
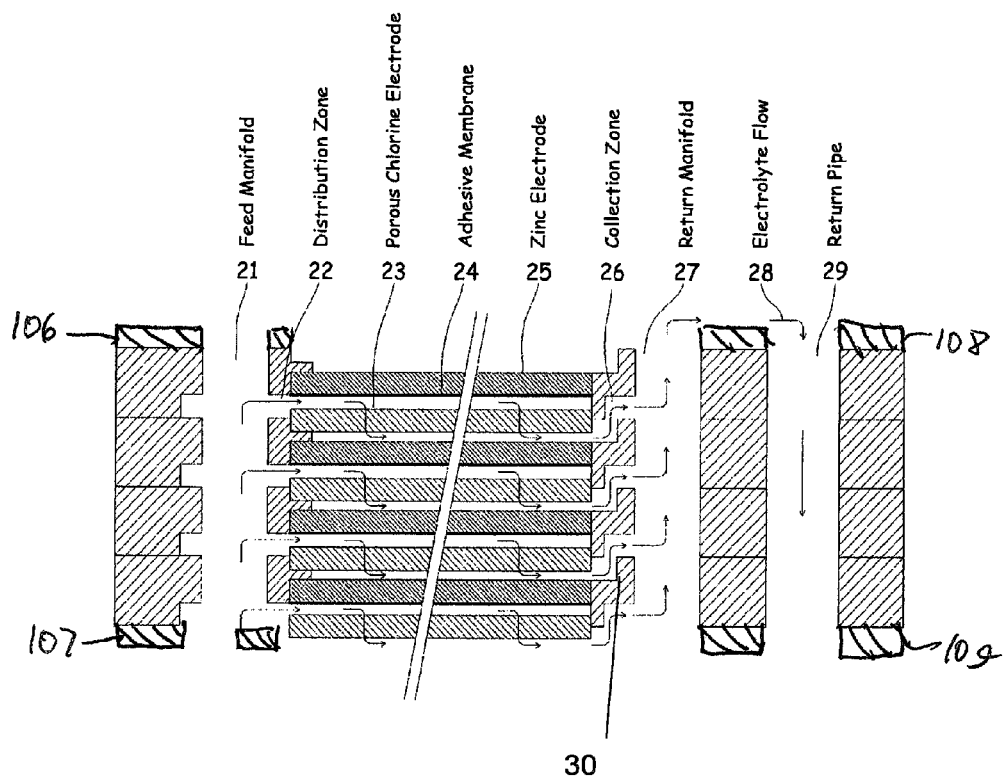
FIG. 2 illustrates a side cross section view of flow paths in a stack of horizontally positioned cells
Figure 3:
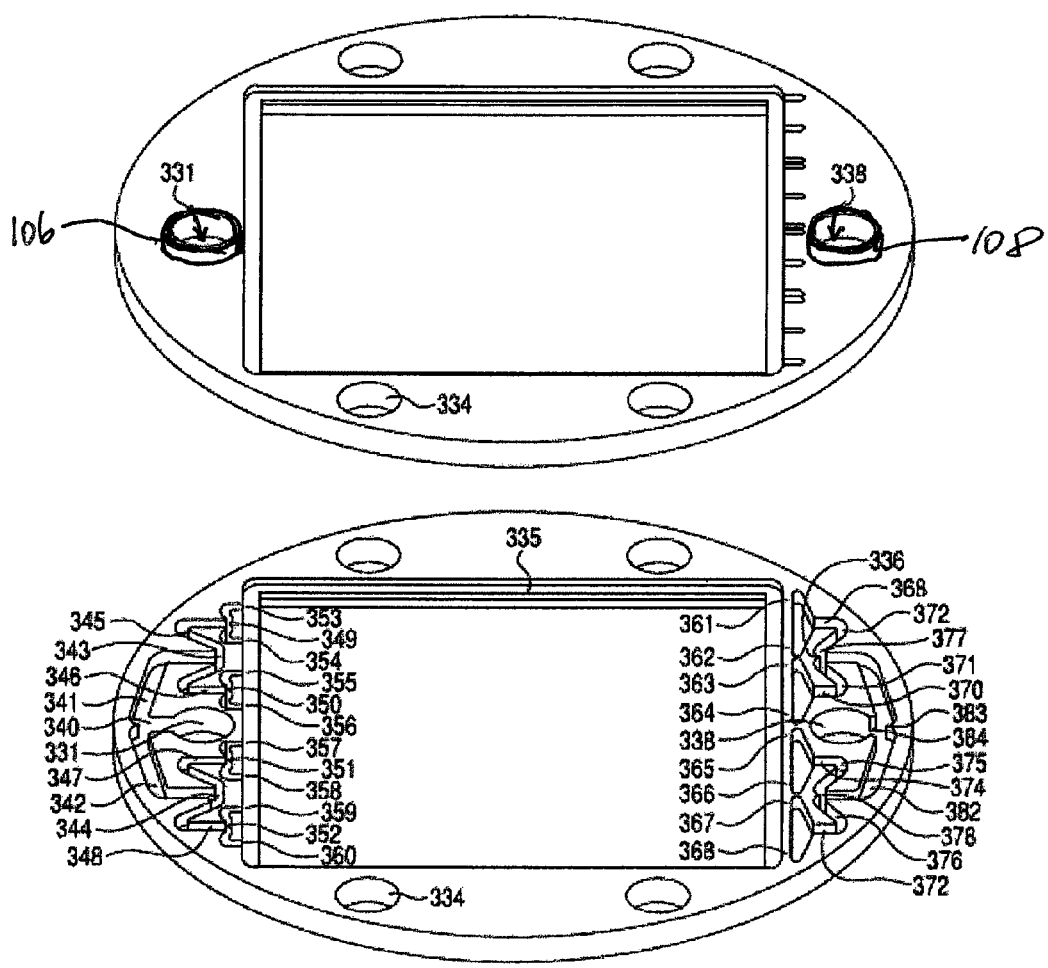
FIG. 3 illustrates a three dimensional view of cell frames that can be used in certain embodiments of the electrochemical energy generation system.

The stack of horizontally positioned cells may be similar to the one disclosed on pages 7-11 and FIGS. 1-3 of PCT application publication No. WO2008/089205, which is incorporated herein by reference in its entirety.

The stack 103A of plural cells 103 may include terminal electrodes 104 and 105. The terminal electrode 104 may be electrically connected to an electrode of a terminal cell of the plurality of cells 103 (such as the top cell in FIG. 1) or be itself an electrode of the terminal cell. Similarly, the electrode 105 may be electrically connected to the other terminal cell of the plurality cells 103 (such as the bottom cell in FIG. 1) or be itself an electrode of this terminal cell.

FIG. 1 shows two manifolds 115 and 120. The first manifold 115 may act as a feed manifold in the discharge mode and as a return manifold in the charge mode, while the second manifold 120 may act as a return manifold in the discharge mode and as a feed manifold in the charge mode. In some embodiments, the manifolds 115 and 120 may be a part of a stack assembly for the stack of the horizontally positioned cells.

The first manifold 115 may contain a first electrode 106 and a second electrode 107, to which the shunt current minimizing voltage may be applied from the respective terminal electrodes of the cells 104 and 105. The second manifold 120 may contain a first electrode 108 and a second electrode 109, to which the shunt current minimizing voltage may be applied from the respective terminal electrodes of the cells 104 and 105. In some embodiments, the electrodes 106 and 108 may be electrically connected to the terminal electrode 104, while the electrodes 107 and 109 may be electrically connected to the terminal electrode 105.

When the shunt current minimizing voltage is not applied to the terminal electrodes of the manifolds 115 and 120, each of these manifolds may have a constant potential throughout the length of each of the manifolds. At the same time, a potential is not constant throughout the length of the stack. As a result, shunt currents may run through the electrolyte between either of the manifolds 115 and 120 and those cells 103 of the stack 103A, which have a potential that is different from the potential of the manifolds. For example, if the potential of the manifold is the same or close to a potential of one of the cells 103 that are in the center of the stack, then the greatest potential difference between the stack 103A and one of the manifolds 115 and 120, which may cause shunt currents, can be for the top and the bottom cells of the stack.

For instance, for illustrative purposes only an electrochemical system, which has 24 cells connected electrically in series and which utilizes a zinc chloride electrolyte and molecular chlorine as a halogen reactant, a potential difference between the top and bottom electrodes of the stack for such a system can be about 48 V, while, when no shunt current minimizing voltage is applied, a potential throughout the length of each of the manifolds 115 and 120 can be about 24 V. In such a system, a shunt current between one of the manifolds 115 and 120 and the stack can be minimal for the central cells of the stack, which have a potential close to 24 V. At the same time, a potential difference between one of the manifolds 115 and 120 and the stack can be significant for cells that away from the center of the stack. Such potential difference will be greater the closer a particular cell is to the end of the stack. For the top and bottom cells of the stack, the potential difference can be about −24 V and +24 V for, respectively. The potential differences between one of the manifolds 115 and 120 and the stack can result in shunt currents for non-central cells of the stack 103A, with the strongest currents for the top and the bottom cells of the stack 103A. In a charge mode, these shunt currents may result in an amount of a depositable metal, such as zinc, deposited on a metal electrode of cell(s) 103, which are closer to the center of the stack, to be different (e.g., less) than an amount of the depositable metal deposited on a metal electrode of cell(s), which are positioned further from the stack center (e.g., at the ends of the stack). In a discharge mode, the shunt currents may result in a faster discharge of the cell(s), which are closer to the center of the stack, compared to the cell(s), which are further from the center of the stack.

In the stack 103A, which includes cells 141-164, central cell 152 will be the least affected by the shunt current, while the terminal cells 141 and 164 will be affected the most.

The shunt current minimizing voltage applied to the electrodes 106 and 107 of the first manifold 115 can result in a potential distribution through the length of the manifold 115 which can mimic or substantially mimic the potential distribution through the stack 103A. If potential difference between electrodes 104 and 105 is 48V, then 48V can be applied to manifolds 115 and 120 via respective electrodes 106/107 and 108/109, which are connected to terminal electrodes 104 and 105. Accordingly, the potential difference between the stack 103 and the manifold 115 and resulting from this difference shunt currents will be reduced or eliminated for non-central cells of the stack. Similarly, the shunt current minimizing voltage applied to the electrodes 108 and 109 of the second manifold 120 can result in a potential distribution through the length of the manifold 120, which can mimic or substantially mimic the potential distribution through the stack 103A. Accordingly, the potential difference between the stack 103A and the manifold 120 and resulting from this difference shunt currents will be reduced or eliminated for non-central cells of the stack.

In some embodiments, the stack 103A may be supported directly by walls of the vessel 101. Yet in some embodiments, the stack 103A may supported by one or more pipes, pillars or strings connected to walls of the vessel 101 and/or reservoir 119.

The first pipe or manifold and the second pipe or manifold may be connected to a reservoir 119 that may contain the liquefied, e.g. liquid, halogen reactant and/or the metal halide reactant. Such a reservoir may be located within the sealed container 101. The reservoir, the first pipe or manifold, the second pipe or manifold and the at least one cell may form a loop circuit for circulating the metal-halide electrolyte and the liquefied halogen reactant.

The metal-halide electrolyte and the liquefied halogen reactant may flow through the loop circuit in opposite directions in charge and discharge modes. In the discharge mode, the pipe or manifold 115 may be used for delivering the metal-halide electrolyte and the liquefied halogen reactant to the at least one cell 103 from the reservoir 119 and the pipe or manifold 120 for delivering the metal-halide electrolyte and the liquefied halogen reactant from the at least one cell back to the reservoir. In the charge mode, the pipe or manifold 120 may be used for delivering the metal-halide electrolyte and/or the liquefied halogen reactant to the at least one cell 103 from the reservoir 119 and the pipe or manifold 115 for delivering the metal-halide electrolyte and/or the liquefied halogen reactant from the at least one cell 103 back to the reservoir 119.

In some embodiments, when the system utilizes a vertical stack of horizontally positioned cells, the pipe or manifold 120 may include a section, which is upward flowing in the discharge mode. The manifold 120 may include an upward running in the discharge mode section 121 and a downward running in the discharge mode section 122. The flow of the metal-halide electrolyte and the liquefied halogen electrolyte leaves the cells of the stack 103A in the discharge mode upward through the section 121 and then goes downward to the reservoir through the section 122. The upward flowing return pipe or manifold may prevent the flow from going mostly through the bottom cell of the stack 103, thereby, providing a more uniform flow path resistance between the cells of the stack.

The electrochemical energy generation system may include one or more pumps for pumping the metal-halide electrolyte and the liquefied halogen reactant. Such a pump may or may not be located within the inner volume of the sealed vessel. For example, FIG. 1 shows discharge pump 123, which fluidly connects the reservoir 119 and the pipe or manifold 115 and which is configured to deliver the metal-halide electrolyte and the liquefied halogen reactant through the pipe or manifold 115 to the electrochemical cell(s) 103 in the discharge mode. In some embodiments, the electrochemical generation system may include charge pump depicted as element 124 in FIG. 1. The charge pump fluidly connects the pipe or manifold 120 to the reservoir 119 and can be used to deliver the metal-halide electrolyte and the liquefied halogen reactant through the return pipe or manifold to the electrochemical cell(s) in the charge mode. In some embodiments, the electrochemical system may include both charge and discharge pumps. The charge and discharge pumps may be configured to pump the metal-halide electrolyte and the liquefied halogen reactant in the opposite directions through the loop circuit that includes the first pipe or manifold and the second pump or manifold. Preferably, the charge and discharge pumps are configured in such a way so that only one pump operates at a given time. Such an arrangement may improve the reliability of the system and increase the lifetime of the system. The opposite pump arrangement may also allow one not to use in the system a valve for switching between the charge and discharge modes. Such a switch valve may often cost more than an additional pump. Thus, the opposite pump arrangement may reduce the overall cost of the system.

Pumps that are used in the system may be centripetal pumps. In some embodiments, it may be preferred to use a pump that is capable to provide a pumping rate of at least 30 L/min. FIG. 1 depicts the reservoir for the liquefied halogen reactant as element 119. The reservoir may be made of a material, which is inert to the halogen reactant. One non-limiting example of such inert material may be a polymer material, such as polyvinyl chloride (PVC). The reservoir may also store the metal halide electrolyte. In such a case, if the liquefied chlorine used as a liquefied halogen reactant, then the chlorine will be separated from the metal halide electrolyte due to a higher density (specific gravity) of the former. FIG. 1 shows liquefied chlorine at the lower part of the reservoir (element 126) and the metal-halide electrolyte being above the liquefied chlorine in the reservoir (element 125).

The reservoir 119 may contain a feed line for the liquefied halogen reactant, which may supply the halogen reactant 126 to the pipe or manifold 115 of the system. A connection between the halogen reactant feed line and the feed manifold of the system may occur before, at or after a discharge pump 123. In some embodiments, the connection between the halogen reactant feed line and the manifold 115 of the system may comprise a mixing venturi. FIG. 1 presents the feed line for the liquefied halogen reactant as element 127. An inlet of the feed line 127, such as a pipe or conduit, may extend to the lower part 126 of the reservoir 119, where the liquefied halogen reactant, such as the liquefied chlorine reactant, may be stored. An outlet of the feed line 127 is connected to an inlet of the discharge pump 123. The electrolyte intake feed line, such as a pipe or conduit 132, may extend to the upper part 125, where the metal-halide electrolyte is located.

In some embodiments, the reservoir 119 may include one or more sump plates, which may be, for example, a horizontal plate with holes in it. The sump plate may facilitate the settling down of the liquefied halogen reactant, such as liquefied chlorine reactant, at the lower part 126 of the reservoir, when the liquefied halogen reactant returns to the reservoir 119, for example, from the return pipe or manifold 120 in the discharge mode. The reservoir 119 is preferably but not necessarily located below the stack of cells 103.

In some embodiments, the reservoir 119 may include one or more baffle plates. Such baffle plates may be vertical plates located at the top and bottom of the reservoir. The baffle plates may reduce and/or prevent eddy currents in the returning flow of the metal-halide electrolyte and the liquefied halogen reactant, thereby enhancing the separation of the liquefied halogen from the metal-halide electrolyte in the reservoir.

In certain embodiments, the discharge pump may be positioned with respect to the reservoir so that it's inlet/outlet is located below the upper level of the metal-halide electrolyte in the reservoir. In certain embodiments, the inlet/outlet of the discharge pump may be positioned horizontally or essentially horizontally. In such an arrangement, the flow of the metal-halide electrolyte and the liquefied halogen reactant may make a 90 degree turn in the discharge pump from a horizontal direction in the inlet to a vertical direction in the feed manifold or pipe 115. In some embodiments, the inlet of the discharge pump 123 may include a bellmouth piece, which may slow down the flow and thereby prevent/reduce formation of turbulence in the reservoir.

The charge pump may also be positioned with it's inlet/outlet located below the upper level of the metal-halide electrolyte in the reservoir. In certain embodiments, the inlet/outlet of the charge pump may be located at a lower level than the inlet/outlet of the discharge pump. The inlet/outlet of the charge pump may also have a bellmouth piece, which may slow down the flow and thereby prevent/reduce formation of turbulence in the reservoir.

Figure 6:
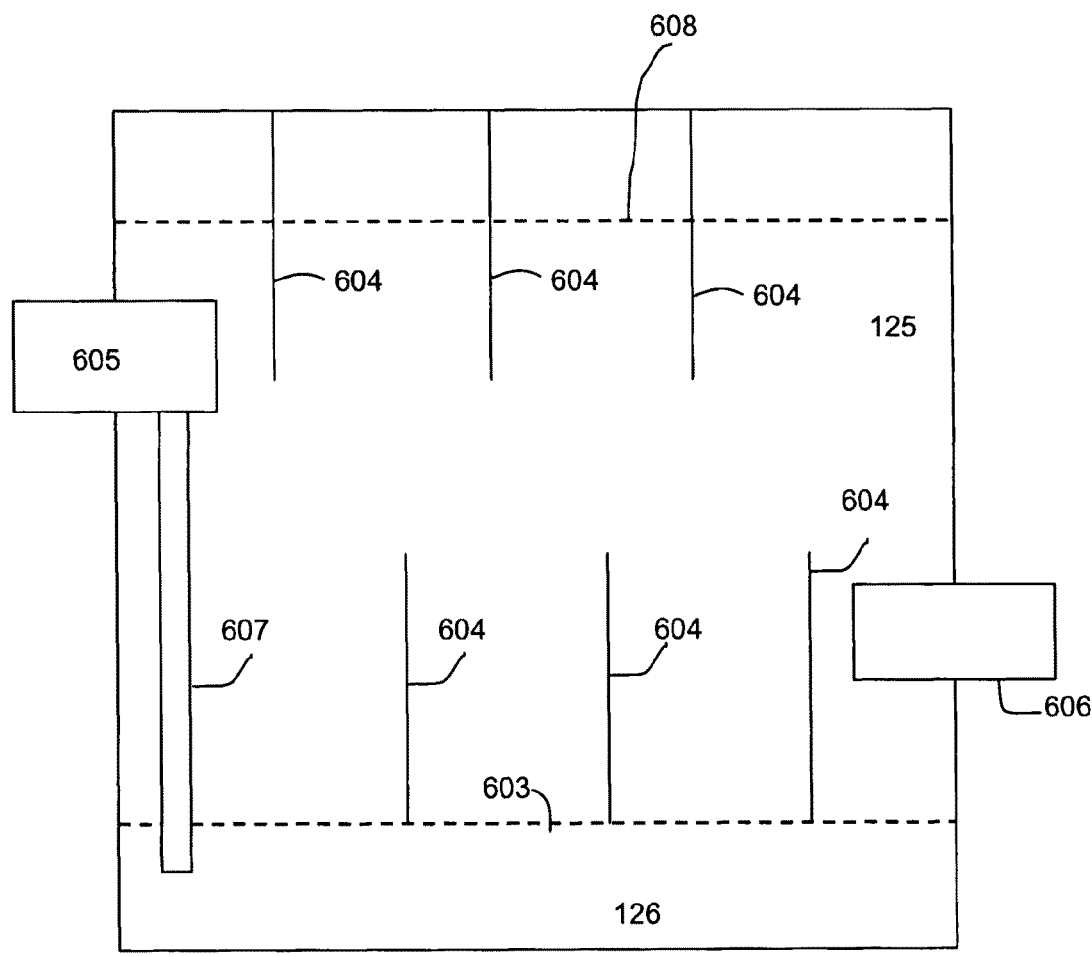
FIG. 6 schematically illustrates a side cross section view of a reservoir which has a sump plate and baffle plates.

FIG. 6 illustrates the reservoir 119 which has a lower part 126, which may contain the liquefied halogen reactant, such as a liquefied molecular chlorine reactant; an upper part 125, which may contain the metal halide reactant; a horizontal sump plate 603, vertical baffle plates 604, a horizontal inlet of a discharge pump 605, a horizontal outlet of a charge pump 606 and a feed line for the liquefied halogen reactant 607, which has an inlet in the lower part 126 of the reservoir and which is connected to the discharge pump's inlet 605. The sump plate 603 is positioned approximately at the level where the boundary between the metal-halide electrolyte and the halogen reactant is expected to be located. Line 608 schematically depicts the upper level of the metal-halide electrolyte in the reservoir. Discharge pump's inlet 605 and charge pump's outlet may protrude through the walls of the reservoir. In some embodiments, the electrochemical system may include a controlling element, which may be used, for example, for controlling a rate of the discharge pump, a rate of the charge pump and/or a rate of feeding the halogen reactant into the electrolyte. Such a controlling element may be an analog circuit. FIG. 1 depicts the controlling element as element 128, which may control one or more of the following parameters: rates of the charge pump 124 and the discharge pump 123 and a feed rate of the liquefied chlorine reagent through the chlorine feed line 127.

The inner volume of the sealed container may have several pressurized zones, each having a different pressure. For example, the inner volume may include a first zone and a second zone, which has a pressure higher than that of the first zone. In some embodiments, the first zone may be enveloped or surrounded by the second, higher pressure zone. The first zone may contain the electrolyte/liquefied halogen reactant loop, i.e. the reservoir 119, the cell(s) 103, pump(s) 123 and 124, manifold(s) 115, 120, while the second surrounding or enveloping zone may be a space between the first zone and the walls of the sealed vessel 101. In FIG. 1, the cells 103, the feed manifold or pipe 115, the reservoir 119, including the metal halide reactant in the upper part 125 of the reservoir and the liquefied halogen reactant in its lower part 126, and the return manifold or pipe 120 all may be in the first pressure zone, while the higher pressure second zone may be represented by the areas 129, 130 and 131 of the inner volume of the vessel 101.

In such an arrangement, a pressure in the first zone may be a pressure sufficient to liquefy the halogen reactant at a given temperature. Such a pressure may be at least 75 psi or at least 100 psi or at least 125 psi or at least 150 psi or at least 175 psi or at least 200 psi or at least 250 psi or at least 300 psi or at least 350 psi or at least 400 psi, such as 75-450 psi or 75-400 psi and all subranges in between. At the same time, a surrounding pressure in the second pressure zone may be higher than a maximum operating pressure of the first zone. Such a surrounding pressure may be at least 75 psi or at least 100 psi or at least 125 psi or at least 150 psi or at least 175 psi or at least 200 psi or at least 250 psi or at least 300 psi or at least 350 psi or at least 400 psi or at least 450 psi or at least 500 psi or at least 550 psi or at least 600 psi, such as 75-650 psi or 200-650 psi or 400-650 psi and all the subranges in between. The enveloped arrangement may provide a number of advantages. For example, in the event of a leak from the first zone/loop circuit, the higher pressure in the surrounding second zone may cause the leaking component(s) to flow inwards the first zone, instead of outwards. Also, the surrounding higher pressure zone may reduce/prevent fatigue crack propagation over components of the first zone/loop circuit, including components made of plastic, such as manifolds and walls of reservoir. The pressurized envelope arrangement may also allow using thinner outer wall(s) for the sealed container/vessel, which can, nevertheless, prevent deformation(s) that could negatively impact internal flow geometries for the metal-halide electrolyte and the liquefied halogen reactant. In the absence of the pressurizing second zone, thicker outer wall(s) may be required to prevent such deformation(s) due to an unsupported structure against expansive force of the internal higher pressure.

In certain embodiments, the outer walls of the sealed container/vessel may be formed by a cylindrical component and two circular end plates, one of which may be placed on the top of the cylindrical component and the other on the bottom in order to seal the vessel. The use of the pressurized envelope arrangement for such outer walls allows using thinner end plates, without exposing internal flow geometries for the metal-halide electrolyte and the liquefied halogen reactant compared to the case when the outer walls are exposed to the variable pressure generated during the operation of the system.

The pressurizing second zone may be filled with an inert gas, such as argon or nitrogen. In some embodiments, the pressurizing second zone may also contain an additional component that can neutralize a reagent, such as the halogen reactant, that is leaking from the first zone, and/or to heal walls of the first zone/loop circuit. Such an additional material may be, for example, a soda ash. Thus, spaces 129, 130 and/131 may be filled with soda ash.

The electrochemical system in a pressurized envelope arrangement may be fabricated as follows. First, a sealed loop circuit for the metal halide electrolyte and the liquefied halogen reagent may be fabricated. The sealed loop circuit can be such that it is capable to maintain an inner pressure above a liquefication pressure of the liquefied halogen for a given temperature. The sealed loop circuit may include one or more of the following elements: one or more electrochemical cells, a reservoir for storing the metal-halide electrolyte and the liquefied halogen reactant; a first manifold or pipe for delivering the metal-halide electrolyte and the liquefied halogen reactant from the reservoir to the one or more cells; a second manifold for delivering the metal-halide electrolyte and the liquefied halogen reactant from the one or more cells back to the reservoir; and one or more pumps. After the loop circuit is fabricated, it may be placed inside a vessel or container, which may be later pressurized to a pressure, which is higher than a maximum operation pressure for a loop circuit, and sealed. The pressurization of the vessel may be performed by pumping in an inert gas, such as argon or nitrogen, and optionally, one or more additional components. When the walls of the vessel are formed by a cylindrical component and two end plates, the sealing procedure may include the end plates at the top and the bottom of the cylindrical component.

FIG. 2 illustrates paths for a flow of the metal-halide electrolyte and the liquefied halogen reactant through the horizontally positioned cells of the stack, such as the stack 103 of FIG. 1, in the discharge mode. The electrolyte flow paths in FIG. 2 are represented by arrows. For each of the cells in the stack, the flow may proceed from a first pipe or manifold 21 (element 115 in FIG. 1), into a distribution zone 22, through a porous "chlorine" electrode 23, over a metal electrode 25, which may comprise a substrate, which may be, for example, a titanium substrate or a ruthenized titanium substrate, and an oxidizable metal, which may be, for example, zinc, on the substrate, to a collection zone 26, through an upward return manifold 27 (element 121 in FIG. 1), and to a second pipe or manifold 29 (element 122 in FIG. 1).

In some embodiments, an element 24 may be placed on a bottom of metal electrode 25. Yet in some other embodiments, such an element may be omitted. The purpose of the element 24 may be to prevent the flow of the metal-halide electrolyte from contacting the active metal electrode, when passing through a porous electrode of an adjacent cell located beneath. In some cases, the element 24 may comprise the polymer or plastic material.

FIG. 2 also shows barriers 30. Each barrier, 30 may be a part of a cell frame discussed in a greater detail below. Barrier 30 may separate the positive electrode from the negative electrode of the same cell. Barriers 30 may comprise an electrically insulating material, which can be a polymeric material, such as poly vinyl chloride (PVC).

In the configuration depicted in FIG. 2, the metal-halide electrolyte may be forced to flow down through the porous electrode and then up to leave the cell. Such a down-and-up flow path may enable an electrical contact of the porous electrode and the metal electrode in each cell with a pool of the metal halide electrolyte remaining in each cell when the electrolyte flow stops and the feed manifold, distribution zone, collection zone, and return manifold drain. Such a contact may allow maintaining an electrical continuity in the stack of cells when the flow stops and may provide for an uninterrupted power supply (UPS) application without continuous pump operation. The down-and-up flow path within each cell may also interrupt shunt currents that otherwise would occur when electrolyte flow stops. The shunt currents are not desired because they may lead to undesirable self-discharge of the energy stored in the system and an adverse non-uniform distribution of one or more active materials, such as an oxidizable metal, such as Zn, throughout the stack.

Figure 5:
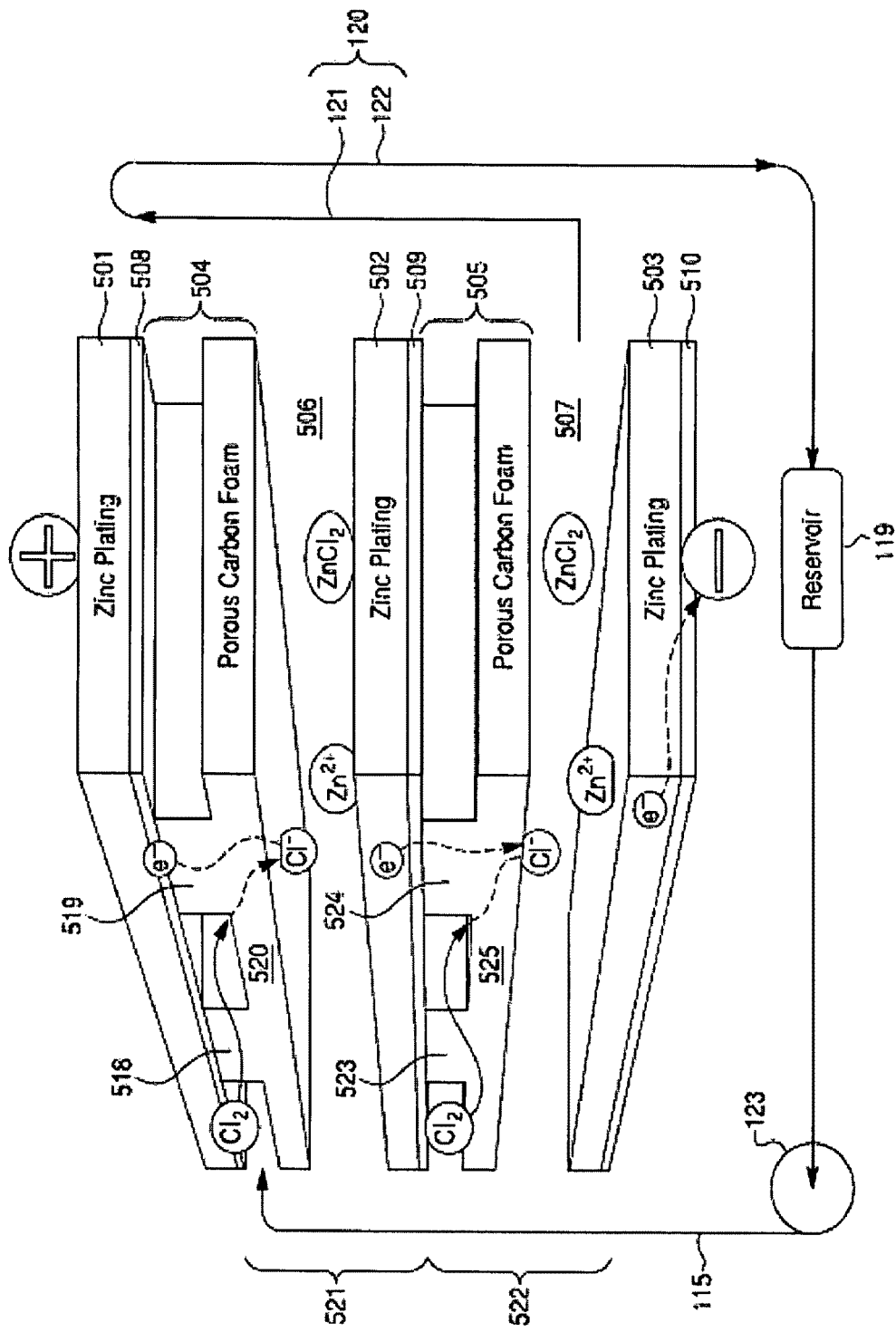
FIG. 5 schematically illustrates a three dimensional view of flow paths in the electrochemical energy generation system in a discharge mode.

FIG. 5 further illustrates flow paths through the stacked cells using $ZnCl_2$ as an exemplary metal-halide electrolyte and $Cl_2$ as an exemplary halogen reactant. The stack in FIG. 5 includes a cell 521, that has a reaction zone 506 between a positive electrode 504, e.g. porous carbon "chlorine" electrode, and a negative electrode 502, e.g. zinc electrode, and a cell 522, that has a reaction zone 507 between a positive electrode 505 and a negative electrode 503. The negative electrode 502 of the cell 522 is electrically connected to the positive electrode 505 of the cell 521, thereby providing electrical continuity between the cells of the stack. Each of the negative electrodes may comprise a conductive impermeable element, which is similar to the element 24 in FIG. 2. Such element is shown as element 509 for the electrode 502 and element 510 for the electrode 503. FIG. 5 also shows an electrode 501 or a terminal plate positioned over the positive electrode 504 of the cell 521. When the cell 521 is the top terminal cell, the electrode 501 can the terminal positive electrode of the stack. If the cell 521 is not the terminal cell, then the electrode 521 can be a negative electrode of an adjacent cell of the stack. The positive electrodes 504 and 505 are preferably porous electrodes, such as porous carbonaceous electrodes, such as carbon foam electrode. The cells may be arranged in the stack in such a manner that a cell to cell distance may be significantly greater that a distance between positive and negative electrodes of a particular cell of the stack (an interelectrode distance). The interelectrode distance may be, for example, 0.5-5 mm such as 1-2 mm. In some embodiments, the cell to cell distance may be at least 3 times or at least 5 times or at least 8 times or at least 10 times, such as 3-15 times greater, than the interelectrode distance. The cell to cell distance may be defined as between two analogous surfaces in two adjacent cell. For example, the cell to cell distance may be a distance between an upper surface of the negative electrode 502 of the cell 521 and an upper surface of the negative electrode 503 of the cell 522. The cell-to cell distance may be 5-20 mm, such as 10-15 mm. The distance between a particular cell's positive and negative electrodes in FIG. 5 is a distance between the lower surface of the positive electrode 504 of the cell 521 and the upper surface of the negative electrode 502 of the same cell. To achieve the significant difference between the cell to cell distance on one hand and the interelectrode distance in a particular cell at least one of positive or negative electrodes may comprise one or more electrically conductive spacers, which (i) increase the cell-to-cell distance compared to the interelectrode distance and (ii) provide a electrical contact between positive and negative electrodes of adjacent cells. In FIG. 5, the positive electrode 505 of the cell 522 has a porous part 525 and two conductive spacers 523 and 524, which are electrically connected to the negative electrode 502 of the adjacent cell 521. The conductive spacers 523 and 524 may or may not be made of a porous material. In certain embodiments, conductive spacers, such as spacers 523 and 524, may be made of carbonaceous material, such as graphite. Similarly to the electrode 505, the electrode 504 of the cell 521 contains a porous part 520 and two conductive spacers 518 and 519.

In addition to the cells 521 and 522, FIG. 5 shows a reservoir 119; a first line or manifold 115, which includes a pump 123; and a second line or manifold 120, which includes an upper running in the discharge mode part 121 and a part 122, which is connected with the reservoir 119. Together the reservoir 119, the first manifold 115, the second manifold 120 and the reaction zones 506 and 507 form a closed loop (e.g. flow circle) for the metal halide electrolyte, which is illustrated as $ZnCl_2$ in FIG. 5, and the halogen reactant ($Cl_2$ in FIG. 5).

In the discharge mode, a mixture of the metal halide electrolyte and the liquefied halogen reactant arrives from the reservoir 119 at the top of a respective positive electrode of a cell, such as electrode 504 for cell 521 and the electrode 505 for the cell 522. The halogen reactant is reduced at the positive electrode. After the mixture penetrates through a porous part of the positive electrode (part 520 for the cell 521 and part 525 for the cell 522), it becomes enriched with halogen anions (Cl⁻ in the case of molecular chlorine used as the halogen reactant). The reaction zone of the cell, such as zone 506 for the cell 521 or zone 507 for the cell 522, does not contain a membrane or a separator configured to separate halogen anions, such as Cl⁻, from the metal halide electrolyte. Thus, from the positive electrode, the halogen anion enriched mixture proceeds down to the negative electrode, such as electrode 502 for the cell 521 and electrode 503 for the cell 522. In the discharge mode, a metal of the negative electrode is oxidized forming positive ions that are released into the halogen anion enriched mixture. For example, if the negative electrode comprises metallic Zn as shown in FIG. 5, the metallic zinc is oxidized into zinc ions, while releasing two electrons. The electrolyte mixture, which is enriched with both halogen anions and metal cations after contacting the negative electrode, leaves the cell through the upper running return manifold and goes back to the reservoir, where the mixture can be resupplied with a new dose of the liquefied halogen reactant. In sum, in the system illustrated in FIG. 5, the following chemical reactions can take place in the discharge mode:

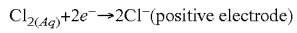

$Cl_{2(Aq)} + 2e^- \rightarrow 2Cl^-$ (positive electrode)

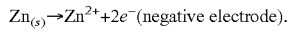

$Zn_{(s)} \rightarrow Zn^{2+} + 2e^-$ (negative electrode).

As the result of these reactions, 2.02 V per cell can be produced.

In the discharge mode, the electrochemical system can consume the halogen reactant and the metal constituting the negative electrode and produce an electrochemical potential. In the charge mode, the halogen reactant and the metal of the electrode may be replenished by applying a potential to the terminal electrodes of the stack. In the charge mode, the electrolyte from the reservoir moves in the direction opposite to the one of the discharge mode. For FIG. 5, such opposite movement means that the electrolyte moves counterclockwise. In the charge mode, the electrolyte enters the cell, such as cell 521 or 522, after passing through the return manifold 520, at the electrode, which acts as a negative electrode in the discharge mode but as a positive electrode in the charge mode. Such electrodes in FIG. 5 are the electrode 502 for the cell 521 and electrode 503 for the cell 522. At this electrode, the metal ions of the electrolyte may be reduced into elemental metal, which may be deposited back at the electrode. For example, for the system in FIG. 5, zinc ions may be reduced and deposited at the electrode 502 or 503 ($Zn^{2+} + 2e^- \rightarrow Zn$). The electrolyte then may pass through a porous electrode, such as electrodes 505 and 504 in FIG. 5, where halogen ions of the electrolyte may oxidize forming molecular halogen reactant. For the case illustrated in FIG. 5, chlorine ions of the metal-halide electrolyte oxidize at the electrodes 505 and 504 forming molecular chlorine. Because the system illustrated in FIG. 5 is placed under a pressure above the liquefication pressure for the halogen reactant, the halogen reactant, that is formed at the electrodes 505 and 504, is in liquid form. The electrolyte leaves the cell, such as cell 521 or 522, in a form of a mixture with the formed halogen reactant through the pipe or manifold 115. A concentration of the metal halide electrolyte in the mixture can be lower than a concentration of the electrolyte that entered the cell from the pipe or manifold 120. From the pipe or manifold 115, the mixture may enter the reservoir, where it can be separated into the halogen reactant and the metal electrolyte per se using, for example, gravity and an optional sump plate.

Before being delivered to the cells, the metal halide electrolyte mixed with the liquefied halogen reactant may undergo one or more flow splits, which may result in multiple flow paths to the porous electrode. These flow paths may have the same flow resistance. Each of the one or more splits may divide the flow into two. For example, FIG. 3 illustrates one possible cell design that has a first level splitting node 340, which splits the flow of the metal halide electrolyte and the liquefied halogen reactant, that is provided through the feed manifold 331, into subflows 341 and 342. Each of the subflows 341 and 342 may further split into two next level subflows at second level splitting nodes 343 and 344 respectively. Each of the four subflows 345, 346, 347, and 348, that are formed at the second level nodes, further split into two third level subflows at third level nodes 349, 350, 351 and 352 respectively. As the result of the three levels of splitting, the flow of the metal halide electrolyte and the liquefied halogen reactant may enter the cell through eight separate paths 353, 354, 355, 356, 357, 358, 359, 360, each of which has the same flow resistance because they have the same length and the same number of turns, which have the same radius, i.e. the same geometry. The flow splitting nodes may split the flow of the electrolyte and the halogen reactant for each cell of the stack.

The electrolyte and the liquefied halogen reactant may leave the cell through a multiple flow paths or through a single flow path. In some embodiments, the multiple flow paths may merge into a lesser number of flows before reaching the return manifold or pipe. For example, FIG. 3 shows that the electrolyte and the liquefied halogen reactant may leave the cell through eight flow paths 361-368. Adjacent flow paths 361 and 362, 363 and 364, 365 and 366, 367 and 368 merge at first level merging nodes 369-372 into second level flow paths 373, 374, 375 and 376 respectively. The second level flow paths further merge at four second level merging nodes 377 and 378 forming two third level flow paths 381 and 382, which further merge at a third level node 383, forming a single flow 384, which enters the return manifold 338. Each of the flow paths 361-368 have the same flow resistance as they have the same length and the same number of turns, which have the same radius, on its way to the return manifold.

FIG. 3 illustrates a electrochemical cell that comprises a cell frame. Such an electrochemical cell may be used to achieve the structures and flows shown in FIG. 2. The cell frame may include a first manifold element 331, distribution channels, flow splitting nodes, spacer ledge 335, flow merging nodes, collection channels, second manifold element 338, and bypass conduit elements 334.

In some embodiments, plural cell frames, that are each identical or similar to the frame depicted in FIG. 3, may be stacked vertically with the electrodes in place, to form the stack shown in FIGS. 1 and 2. To form such a stack, the first manifold element, such as the element 331 in FIG. 3, in each of the plural cells frames may be aligned with the first manifold element in another of the cell frames, thereby to form a first manifold of the system. The distribution channels and the flow splitting nodes in each of the cell frames may be aligned with the distribution channels and the flow splitting nodes in another of the cell frames, thereby forming a distribution zone of the system. The positive electrode (discharge mode) of each of the cells sits above or below the negative electrode (discharge mode) for each cell on the spaces ledges of the cell frames, thereby forming alternating layers of positive electrodes and negative electrodes. The flow merging nodes and the collection channels in each of the plural cells frames may be aligned with the flow merging nodes and the collection channels in another of the cell frames, thereby forming a collection zone of the system. The second manifold element, such as the element 338 in FIG. 3, in each of the cell frames may be aligned with the second manifold element in another of the cell frames, thereby forming a second manifold of the system. The bypass conduit element, such as the element 334 in FIG. 3, in each of the cell frames may be aligned with the bypass conduit element in another of the cell frames, thereby forming a bypass conduit of the system. The bypass conduit may be used for fluid flow and/or electrical wires or cables.

Electrodes 106 and 107 may comprise ruthenized titanium rings on respective top and bottom cell frames formed around top and bottom of the manifold 331, while electrodes 108 and 109 may comprise ruthenized titanium rings on respective top and bottom cell frames formed around top and bottom of the manifold 338, as shown in FIG. 3.

In some embodiments, the cell frame may have a circular shape. Such a shape may facilitate insertion of the plural cells into a pressure containment vessel such, which has a cylindrical shape, thereby reducing a production cost for the system. The frames may comprise an electrically insulating material, which may be a polymer material, such as PVC. The cell frame based design may facilitate a low-loss flow with uniform distribution for the electrolyte and the halogen reactant; a bipolar electrical design; an ease of manufacture, internal bypass paths, and elements by which the operational stasis mode (described below) may be achieved.

Advantages of the cell frame may include, but are not limited to, the flow-splitting design in the distribution zone that may include multiple order splits such as the first, second, and third order splits in the flow channels in FIG. 3, that result in multiple channels that each have the same flow resistance, because each of the channels has the same length and the number and radius of bends. FIG. 3 shows eight feed channels per cell that each have the same flow resistance. This design with multiple flow splits may allow maintenance of a laminar flow through each of the multiple channels. The design may allow equal division of flow volume between the multiple channels, independent of flow velocity, uniformity of viscosity, or uniformity of density in the electrolyte.

Modes of Operation

An Off Mode may be used for storage or transportation of the electrochemical energy generation system. During the Off Mode, the metal halide electrolyte and the halogen reactant are not delivered to the cell. A small amount of the halogen reactant, which may remain in the horizontally positioned, may be reduced and combined with metal ions to form metal halide. For example, the remaining liquefied chlorine reactant may be reduced into halogen anions and combined with zinc ions to form zinc chloride.

In the off mode, the terminal electrodes of the one or more cells of the system may be connected via a shorting resistor, yielding a potential of zero volts for the cells of the system. In some embodiments, a blocking diode preferably may be used to prevent reverse current flow through the system via any external voltage sources.

During the Discharge Mode the discharge pump may be on and the mixture of the metal halide electrolyte and the halogen reactant may be circulated through the cell(s) of the system. Electrons may be released as metal cations are formed from the oxidizable metal that constitutes the negative electrode. The released electrons may be captured by the halogen reactant, thereby reducing the reactant to halogen anions and creating an electrical potential on terminal electrodes of the cell(s) of the system. The demand for power from the system may consume the halogen reactant, causing a release of an additional dose of the liquefied halogen reactant from the reservoir into the feed pipe or manifold of the system.

During the Stasis or Standby Mode, there may be little or no flow of the metal halide electrolyte and the halogen reactant. The availability of the system may be maintained via a balancing voltage. This balancing voltage may prevent a self-discharge of the system by maintaining a precise electrical potential on the cell(s) of the system to counteract the electrochemical reaction forces that can arise when there is no circulation of the metal halide electrolyte and the halogen reactant.

During the Charge Mode, the charge pump may be on, or the discharge pump may be operated in reverse direction, and the electrolyte, that may contain cations of a depositable metal, such as zinc, and anions, such as halogen (e.g. chlorine) anions, may be circulated through the cell(s) of the system. Application of a deposition voltage to the terminal electrodes of the system may result in deposition of the depositable metal on the negative electrode of each of the cell(s) through the reduction of the depositable metal's cations into the metal in its elemental form. At the same time, on the positive electrode of each of the cell(s), an oxidation of the halogen anions into elemental halogen may take place. For example, chlorine anions may be oxidized into molecular chlorine.

The particular design of the cell plates disclosed may interrupt shunt currents that would otherwise flow through the feed and return manifolds, while maintaining cell-to-cell electrical continuity.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

What is claimed is:

1. A method of operating an electrochemical system comprising:
    (A) providing an electrochemical system comprising:
        (a) a plurality of cells connected in series, wherein each of the cells comprises:
            a first electrode;
            a second electrode; and
            a reaction zone between the first and second electrodes;
        (b) a halogen reactant;
        (c) a metal halide electrolyte; and
        (d) at least one of (i) a first manifold configured to deliver at least one of the halogen reactant and the metal halide electrolyte to the reaction zone for each of the cells and (ii) a second manifold configured to collect at least one of the halogen reactant and the metal halide electrolyte from the reaction zone for each of the cells;
    (B) conveying a flow of the metal halide electrolyte and the halogen reactant through the reaction zone of each of the cells; and
    (C) applying a shunt-current minimizing voltage to terminals of at least one of the first manifold and the second manifold during said conveying.

2. The method of claim 1, wherein the first electrode comprise a porous, electrically conductive material.

3. The method of claim 1, wherein the halogen reactant comprises molecular chlorine.

4. The method of claim 3, wherein the metal halide electrolyte comprises zinc chloride and the second electrode comprises metallic zinc.

5. The method of claim 3, wherein the halogen reactant comprises a liquid chlorine reactant.

6. The method of claim 1, wherein said conveying comprises conveying a flow of the metal halide electrolyte and the halogen reactant through a loop circuit that includes the first manifold, the second manifold and the reaction zone of each of the cells.

7. The method of claim 1, wherein the system further comprises at least one pump and wherein said conveying comprising is performed used said at least one pump.

8. The method of claim 7, wherein the at least one pump comprises a discharge pump and a charge pump and wherein said conveying comprises a) conveying the flow of at least one of the metal halide electrolyte and the halogen reactant through the reaction zone of each of the cell in a first direction using the discharge pump or b) conveying the flow of at least one of the metal halide electrolyte and the halogen reactant through the reaction zone of each of the cell using the charge pump in a second direction, that is opposite to the first direction.

9. The method of claim 8, wherein said conveying is conveying the flow of at least one of the metal halide electrolyte and the halogen reactant through the reaction zone of each of the cell in the first direction using the discharge pump and wherein the shunt current minimizing voltage is substantially equal to an output voltage of the series of cells.

10. The method of claim 8, wherein said conveying is conveying the flow of at least one of the metal halide electrolyte and the halogen reactant through the reaction zone of each of the cell in the second direction using the charge pump and wherein the shunt current minimizing voltage is substantially equal to a charge voltage applied to the cells.

11. The method of claim 1, wherein the cells comprise a vertical stack of horizontal cells.

12. The method of claim 11, wherein the shunt current minimizing voltage is applied to the terminals of at least one of the first manifold and the second manifold from terminal electrodes of the stack.

13. The method of claim 12, wherein the first and second manifolds are vertical manifolds.

14. The method of claim 12, wherein the second manifold comprises an upward flowing section.

15. The method of claim 12, wherein said applying comprises applying the shunt current minimizing voltage between upper and lower terminals of the first manifold and between upper and lower terminals of the second manifold.

16. The method of claim 1, wherein the system further comprises a pressurized sealed vessel that contains the cells, the halogen reactant, the metal halide electrode and the first and the second manifolds and wherein a pressure in an inner volume of the vessel is above a liquefication pressure for the halogen reactant.

* * * * *